(12) United States Patent
Miyakoshi et al.

(10) Patent No.: US 7,173,885 B2
(45) Date of Patent: Feb. 6, 2007

(54) DOMAIN-WALL-DISPLACEMENT-TYPE MAGNETOOPTICAL RECORDING MEDIUM

(75) Inventors: Toshimori Miyakoshi, Kanagawa (JP); Yukari Aoki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 675 days.

(21) Appl. No.: 10/718,600

(22) Filed: Nov. 24, 2003

(65) Prior Publication Data

US 2004/0163097 A1    Aug. 19, 2004

(30) Foreign Application Priority Data

Dec. 9, 2002    (JP)    ............... 2002-356697

(51) Int. Cl.
  *G11B 11/00*    (2006.01)
(52) U.S. Cl. ............... 369/13.52; 369/13.47; 369/13.08
(58) Field of Classification Search ............ 369/13.08, 369/13.07, 13.09, 13.52, 13.47, 13.44, 13.46, 369/13.54, 13.53, 13.39; 720/718; 428/694 MM, 428/694 EC, 694 ML, 820, 819
See application file for complete search history.

(56) References Cited

U.S. PATENT DOCUMENTS

| | | | |
|---|---|---|---|
| 6,027,825 A | 2/2000 | Shiratori et al. ..... | 428/694 ML |
| 6,345,016 B1 * | 2/2002 | Shiratori .............. | 369/13.54 |
| 6,894,954 B2 * | 5/2005 | Aoki ..................... | 369/13.44 |
| 2002/0106534 A1 | 8/2002 | Aoki ..................... | 428/694 ML |
| 2003/0175554 A1 | 9/2003 | Miyakoshi ............ | 428/693 |
| 2003/0189878 A1 | 10/2003 | Miyakoshi ............ | 369/13.45 |

FOREIGN PATENT DOCUMENTS

JP    6-290496    10/1994

OTHER PUBLICATIONS

Shiratori et al., "High-Density Magneto-optical Recording with Domain Wall Displacement Detection", J. Mag. Soc. Jpn., vol. 22, Suppl. No. 52 (1998), pp. 47-50.
Shiratori et al., "High-Density Magneto-optical . . . Detection", J. Magn. Soc. Jpn., vol. 22, Suppl. 52 (1998), pp. 47-50.

* cited by examiner

*Primary Examiner*—Ali Neyzari
(74) *Attorney, Agent, or Firm*—Fitzpatrick, Cella, Harper & Scinto

(57)    ABSTRACT

A domain-wall-displacement-type magnetooptical recording medium is provided in which a floating magnetic field from a surrounding portion that operates on a recording/reproducing portion is suppressed. The recording medium includes a displacement layer having a composition such that rare-earth-element sub-lattice magnetization is dominant at room temperature, a switching layer, a memory layer, and a magnetization compensation layer in which iron-family-element sub-lattice magnetization is dominant at room temperature, for suppressing generation of a stray magnetic field at a temperature near room temperature.

6 Claims, 17 Drawing Sheets

DOMAIN-WALL-DISPLACEMENT-TYPE MAGNETOOPTICAL RECORDING MEDIUM

BACKGROUND OF THE INVENTION

1. Field of the Invention

The present invention relates to a domain-wall-displacement-type magnetooptical recording medium suitable for ultra-high-density recording utilizing displacement of domain walls during a reproducing operation. More particularly, the invention relates to a domain-wall-displacement-type magnetooptical recording medium having excellent recording/reproducing characteristics at a narrow track pitch and very small marks.

2. Description of the Related Art

Various magnetic recording media are used practically as rewritable recording media. Particularly, magnetooptical recording media in which information is recorded by writing magnetic domains in a magnetic thin film utilizing thermal energy of a semiconductor laser and the resulting recorded information is read using a magnetooptical effect are employed as large-capacity rewritable media allowing high-density recording. Recently, in accordance with the tendency toward digital recording of moving images, a need has arisen to provide large-capacity recording media by increasing the recording density of these magnetic recording media.

In general, the linear recording density of an optical recording medium greatly depends on the laser wavelength λ of a reproducing optical system and the numerical aperture (NA) of an objective. That is; since the diameter of a beam width is determined when the laser wavelength λ of the reproducing optical system and the numerical aperture (NA) of the objective are determined, the spatial frequency of a recording pit capable of reproducing a signal has a limit of about 2 NA/λ. Accordingly, in order to realize a high recording density in a conventional optical disk, it is necessary to shorten the laser wavelength of the reproducing optical system or increase the NA of the objective. However, it is difficult to shorten the laser wavelength because of problems in the efficiency and heat generation of a laser device, and the like. An increase in the NA of the objective requires high mechanical accuracy, for example, as a result of a decrease in the depth of focus.

Accordingly, various techniques for realizing high-density recording are being developed in which the recording density is improved by optimizing the configuration of a recording medium, or a reproducing method without changing the laser wavelength and the NA of the objective.

For example, in Japanese Patent Application Laid-Open (Kokai) No. 6-290496 (1994), a magnetooptical recording medium and a method for reproducing the same have been proposed in which, by displacing a domain wall present at a boundary portion of recording marks toward a higher temperature side by a temperature gradient and detecting the displacement of the domain wall, a signal having a recording density exceeding the resolution of an optical system can be reproduced without decreasing the amplitude of the reproduced signal. Such a reproducing method is called a DWDD (domain wall displacement detection) reproducing method. The configuration of the medium and the method for reproducing the medium are shown in FIGS. 21A–21C. In FIG. 21A, the medium includes a first magnetic layer 12001 having a small domain-wall coercive force, a second magnetic layer 12002 having a low Curie temperature, and a third magnetic layer 12003 having a large domain-wall coercive force. As described in "J. Magn. Soc. Jpn., 22, Suppl. No. S2, pp 47–50 (1998)", the first magnetic layer 12001 operates as a displacement layer in which displacement of a domain wall occurs during a reproducing operation, the second magnetic layer 12002 operates as a switching layer for controlling the position of the start of displacement of the domain wall, and the third magnetic layer 12003 operates as a memory layer for holding information.

When a temperature distribution as shown in FIG. 21B is formed on these magnetic films, a domain-wall-energy-density distribution as shown in FIG. 21C is formed, so that a domain-wall driving force to displace domain walls toward a high temperature side having a low energy is generated. However, since these magnetic layers are subjected to exchange coupling at a region of temperatures lower than the Curie temperature of the switching layer, displacement of domain walls does not occur because of the large domain-wall coercive force of the memory layer, even when the domain-wall driving force is applied. On the other hand, since the exchange coupling force is weakened at a position of a temperature Ts near the Curie temperature of the switching layer, only domain walls in the displacement layer having a small domain-wall coercive force are displaced toward a high temperature side.

This displacement of domain walls is generated with a time interval corresponding to the spatial interval of the domain walls, when the medium is moved relative to the temperature distribution. Accordingly, by detecting the generation of displacement of domain walls, it is possible to generate a signal irrespective of the resolution of the optical system.

In conventional DWDD media, in order to allow smooth domain wall displacement during a reproducing operation, i.e., in order to mitigate the influence of a floating magnetic field at a temperature near a reproducing temperature where domain walls are displaced, the composition is designed so that the total magnetization of the displacement layer is substantially zero at a temperature (hereinafter represented by "Ts") near the Curie temperature of the switching layer, i.e., a reproducing temperature. In such conventional media, there is no consideration given to total magnetization at a low temperature region from room temperature to reproducing temperature, or the influence of a random stray magnetic field from random magnetization present at an adjacent track in a low temperature region equal to or lower than Ts, or in front of and behind the track. It has not been previously recognized that these factors cause problems. Particularly, when intending to narrow the track pitch or provide a very small mark, the influence of a random stray magnetic field cannot be neglected. To do so results in degradation of recording/reproducing characteristics.

When intending to provide a very small recording mark length, a magnetic film having large magnetic anisotropy is used as the memory layer for holding information, which permits stable recording/holding of a further smaller recording mark. As a result, the energy required for magnetization reversal during a recording operation is greater. The intensity of a magnetic field that can be generated by a magnetic head in magnetic-field modulation recording suitable for high density recording is, at most, about 200–300 Oe (oersted in the CGS system of units), and is preferably equal to or less than 200 Oe during high-speed recording at low power consumption. Accordingly, for example, it is necessary to set the magnitude of magnetization of the memory layer to a more or less large value in the recording temperature range by adjusting the composition ratio or adopting a multilayer structure.

However, when adjusting magnetization at a region near the recording temperature range in the above-described manner, magnetization inevitably has a large value at a low-temperature region equal to or lower than Ts, which results in a greater influence thereon by the stray magnetic field during a reproducing operation.

In a land/groove substrate, as shown in FIG. 22, the height of a memory layer of a groove portion and the height of a displacement layer of a land portion of each of adjacent tracks have substantially the same value. This results in degradation of the recording-magnetic-field sensitivity by the influence of a stray magnetic field from the displacement layers of the adjacent tracks during a recording operation in a groove portion.

As described above, in a medium used in a DWDD reproducing method, balancing desired improvement in surface recording density, for example, by using very small marks and a narrow track pitch, while simultaneously improving recording/reproducing characteristics is very difficult.

SUMMARY OF THE INVENTION

The present invention has been made in consideration of the above-described problems.

It is an object of the present invention to solve the above-described problems in conventional DWDD recording media.

It is still another object of the present invention to provide a domain-wall-displacement-type magnetooptical recording medium capable of obtaining excellent recording/reproducing characteristics even when a very small mark and a narrow track pitch are used.

According to one aspect of the present invention, a domain-wall-displacement-type magnetooptical recording medium includes a displacement layer in which domain walls are displaced and rare-earth-element sub-lattice magnetization is dominant at room temperature, a memory layer for holding recorded magnetic domains, and a switching layer provided between the displacement layer and the memory layer that has a Curie temperature lower than Curie temperatures of the displacement layer and the memory layer. Information is reproduced by magnifying the recorded magnetic domains transferred from the memory layer to the displacement layer, by displacing domain walls of the recorded magnetic domains. The medium also includes a magnetization compensation layer having a composition such that iron-family-element sub-lattice magnetization is dominant at room temperature.

The foregoing and other objects, advantages and features of the present invention will become more apparent from the following description of the preferred embodiments taken in conjunction with the accompanying drawings.

DESCRIPTION OF THE PREFERRED EMBODIMENTS

It is a feature of the present invention that, in a domain-wall-displacement-type magnetooptical recording medium including (i) a displacement layer in which domain walls are displaced and rare-earth-element sub-lattice magnetization is dominant at room temperature, (ii) a memory layer for holding recorded magnetic domains, and (iii) a switching layer provided between the displacement layer and the memory layer has a Curie temperature lower than Curie temperatures of the displacement layer and the memory layer, there is provided a magnetization compensation layer having a composition such that iron-family-element sub-lattice magnetization is dominant at room temperature. This magnetization compensation layer may be provided as a separate layer or as a sub-layer which is part of the above-described three-layer configuration. The term "total magnetization" as used herein indicates magnetization of a magnetic layer among the magnetic layers, or also magnetization of all the entire magnetic layers when the medium has a multilayer structure. The term "compensation" does not always indicate that the magnitude of magnetization after compensation becomes zero, but rather indicates a state in which the magnitude of magnetization is reduced.

Figure 1:
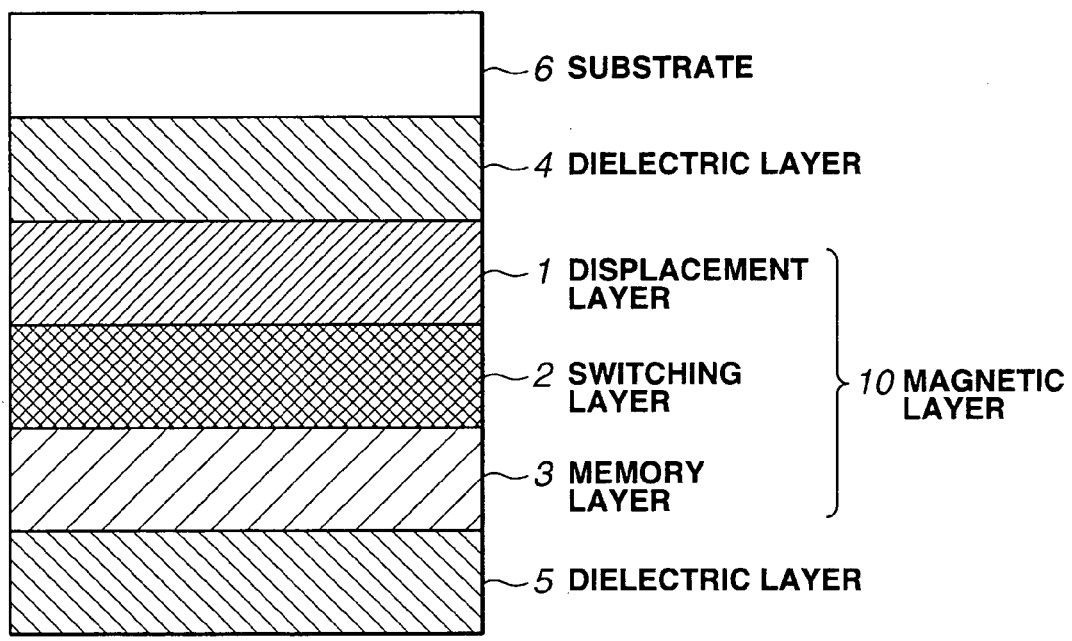
FIG. 1 is a schematic cross-sectional view illustrating the configuration of basic layers of a magnetooptical recording medium according to the present invention.

FIG. 1 is a schematic cross-sectional view illustrating the configuration of basic layers of a magnetooptical recording medium according to the present invention. A magnetization compensation layer is not specifically illustrated, but is present, since the layer compensation may be laminated at various positions. A description will be provided initially of magnetic layers other than the magnetization compensation layer. The magnetization compensation layer is present as a separate layer or as a sub-layer of a magnetic layer 10.

As shown in FIG. 1, the magnetooptical recording medium of the invention is obtained by sequentially laminating a dielectric layer 4, a magnetic layer 10, and a dielectric layer 5 on a transparent substrate 6. The magnetic layer 10 is obtained by sequentially laminating a displacement layer 1 in which domain walls are displaced, a switching layer 2 provided between the displacement layer 1 and a memory layer 3 that has a Curie temperature lower than Curie temperatures of these layers, and the memory layer 3 for recording (storing) recorded magnetic domains representing information from the substrate 6 side. At least the displacement layer 1 from among these magnetic layers has a composition such that total magnetization is close to zero at a temperature near the Curie temperature of the switching layer 2, i.e., a reproducing temperature, and has a composition such that rare-earth-element sub-lattice magnetization is dominant at room temperature. These magnetic layers are subjected to exchange coupling at temperatures lower than the Curie temperature of the switching layer 2.

For example, transparent polycarbonate, glass or the like is used as the substrate 6.

Although a description will be provided of the configuration of layers of the magnetooptical recording medium for reproducing information by projecting a laser beam through the substrate 6, the present invention is not limited to such a configuration. When projecting a laser beam from a film side opposite to the substrate 6, the order of the magnetic layers may be reversed, and an opaque material may be used for the substrate 6.

For example, a transparent dielectric material, such as $Si_3N_4$, AlN, $SiO_2$, SiO, ZnS, $MgF_2$ or the like, may be used for the dielectric layer 4. A similar dielectric material may also be used for the dielectric layer 5 that is also formed as a protective layer. These layers may be formed, for example, according to continuous sputtering using a magnetron sputtering apparatus, continuous vacuum deposition, or the like.

In addition to the configuration of the magnetooptical recording medium, a metal layer made of Al, AlTa, AlTi, AlCr, Cu or the like may also be formed, in order to allow adjustment of thermal characteristics. Furthermore, a protective coating made of polymer resin may also be formed. In addition, substrates having formed layers may be bonded.

In the configuration of the magnetooptical recording medium of the invention, the respective magnetic layers may be made of various magnetic materials. For example, a rare-earth/iron-family amorphous alloy including 10–40 atomic % of one or at least two of rare-earth metal elements, such as Pr, Nd, Sm, Gd, Tb, Dy, Ho and the like, and 90–60 atomic % of one or at least two of iron-family elements, such as Fe, Co, Ni and the like, may be used. In order to improve corrosion resistant property, a small amount of elements selected from Cr, Mn, Cu, Ti, Al, Si, Pt, In and the like may also be added.

In the case of a heavy-rare-earth/iron-family amorphous alloy, saturation magnetization can be controlled by changing the composition ratio of rare-earth elements and iron-family elements. It is also possible to control the Curie temperature by changing the composition ratio. In order to control the Curie temperature independently of saturation magnetization, a method of using a material in which part of Fe is replaced by Co as iron-family elements, and controlling the amount of replacement is more preferably utilized. That is, by replacing 1 atomic % of Fe by Co, a rise in the Curie temperature of about 6° C. is obtained. Accordingly, it is possible to adjust the amount of addition of Co so as to obtain a desired Curie temperature using the above-described relationship. It is also possible to decrease the Curie temperature by adding a very small amount of non-magnetic element, such as Cr, Ti or the like. The Curie temperature can also be controlled by adjusting the composition ratio of at least two kinds of rare-earth elements.

Another magnetic layer may be added to the above-described basic configuration. For example, in order to realize compatibility of excellent domain wall displacement and the magnetooptical effect during a reproducing operation, a configuration may be adopted in which multiple displacement layers are provided, or a composition gradient may be provided in the direction of the thickness of a displacement layer.

In order to suppress unnecessary domain wall displacement (a ghost signal) at a rear end portion of a reproducing beam spot, a control layer having a high domain-wall-energy density with respect to the displacement layer may be provided between the switching layer and the displacement layer. A TbFeCo- or TbDyFeCo-type material, or the like may be used as the material for the control layer.

In order to improve the recording sensitivity, a recording auxiliary layer whose magnetization can be easily reversed by an external magnetic field may be provided at a portion adjacent to the memory layer. A magnetic film made of a GdFeCo- or GdDyFeCo-type material may be used for this layer.

Each of the above-described layers is configured so as to have a compensated composition at a temperature near the Curie temperature of the switching layer, in order to make saturation magnetization at a reproducing temperature nearly zero.

The above-described magnetic layers can be formed, for example, by successive sputtering using a magnetron sputtering apparatus, successive vacuum deposition, or the like. The respective magnetic layers are subjected to exchange coupling by being successively formed without being exposed to air.

The domain-wall coercive force and the domain-wall energy density are mainly controlled by selecting material elements, but may also be adjusted by the state of the underlying dielectric layer 4, or film-forming conditions, such as the pressure of a sputtering gas, and the like. Tb- or Dy-type materials have large anisotropy, domain-wall coercive force and domain-wall energy density. Gd-type materials have small anisotropy, domain-wall coercive force and domain-wall energy density. These physical properties can also be adjusted, for example, by addition of impurities. The film thickness can be controlled by the film-forming speed and the film-forming time.

Recording of a data signal in the magnetooptical recording medium of the invention is performed by causing the state of magnetic orientation of the memory layer to correspond to the data signal according to magnetic recording or thermomagnetic recording. Thermomagnetic recording is performed according to a method of modulating an external magnetic field by irradiating a laser beam having power to raise the temperature of the memory layer to at least the Curie temperature while moving the medium, or according to a method of modulating the power of a laser beam while applying a magnetic field in a constant direction.

Figure 20:
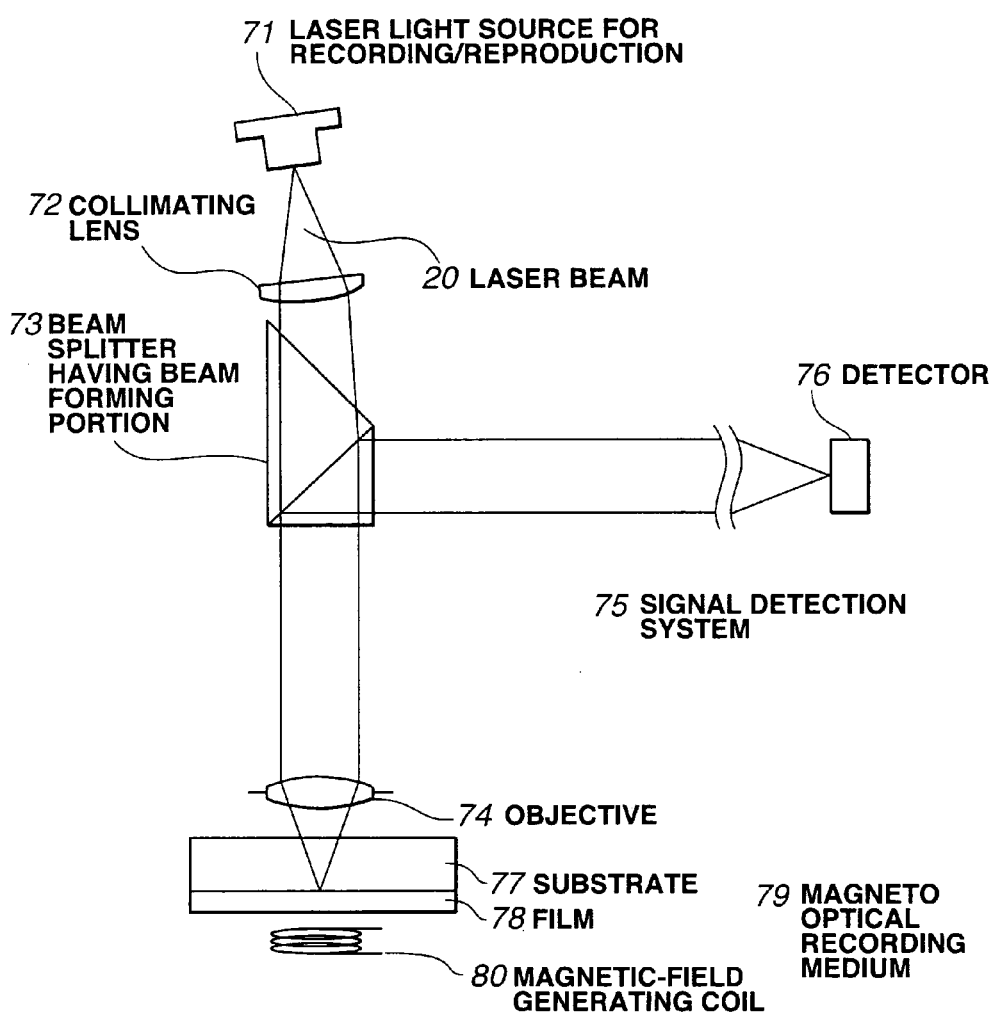
FIG. 20 is a diagram illustrating an optical disk apparatus used for evaluation of recording/reproducing characteristics in the present invention.

FIG. 20 is a schematic diagram illustrating an optical system provided in a recording/reproducing apparatus for recording/reproducing a data signal in the magnetooptical recording medium of the invention. As shown in FIG. 20, the optical system includes a signal detection system 75 that includes, in the order of the optical path, a laser light source 71 for emitting a laser beam 20, a collimating lens 72 for converting the laser beam 20 emitted from the laser light source 71 into a parallel beam, a beam splitter 73 for transmitting the laser beam 20 from the laser light source 71 and reflecting light returning from the magnetooptical recording medium, an objective 74 for condensing the laser beam 20 transmitted through the beam splitter 73 onto the magnetooptical recording medium, and a detector 76 for receiving the returned light reflected by the beam splitter 73. The laser light source 71 is a light source for recording/reproduction, and the wavelength of the laser beam 20 is 660 nm. The beam splitter 73 has a shaping portion for shaping the laser beam 20.

Figure 21A:
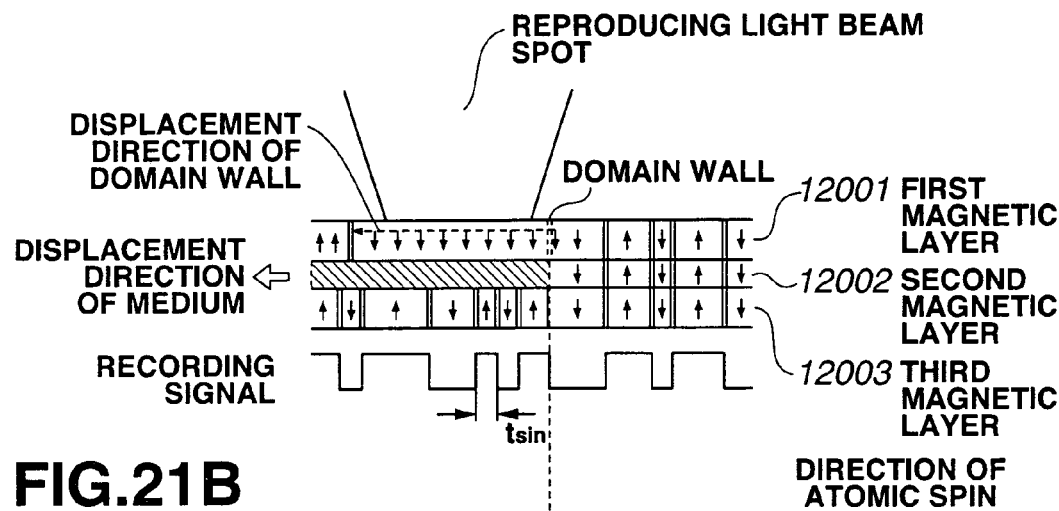
FIGS. 21A–21C are schematic diagrams illustrating the concept of a DWDD reproducing method.
Figure 21B:
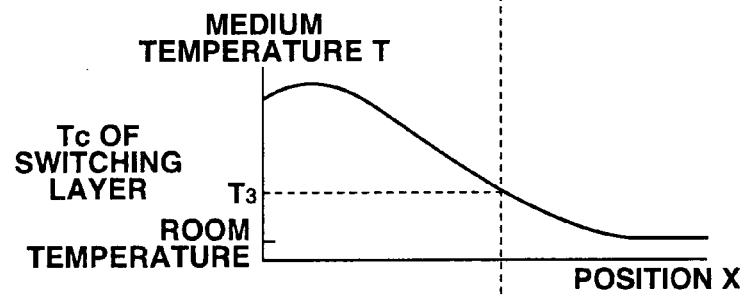
Figure 21C:
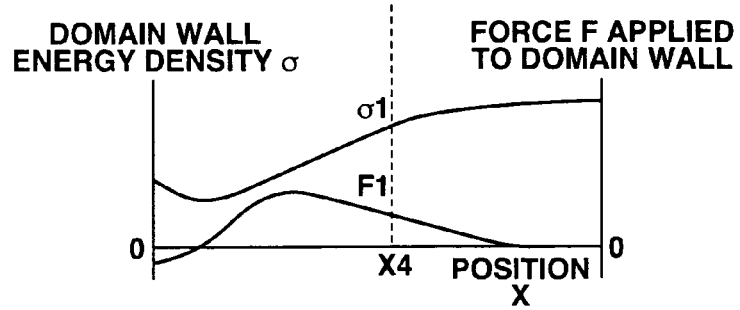

In an optical disk apparatus having the above-described optical system, the laser beam 20 emitted from the laser light source 71 (having a wavelength of 650 nm) is condensed by the objective 74 (having a NA of 6.0), to form a beam spot for recording/reproduction. Recording of a data signal is performed by forming a recording beam spot while moving the magnetooptical recording medium 79 consisting of substrate 77 and film 78 at a desired linear velocity, simultaneously generating an external magnetic field using a magnetic-field generating coil 80, and forming recorded magnetic domains by changing the direction of the external magnetic field at a high frequency in accordance with data. Reproduction of a data signal is performed using a reproducing beam spot, by moving the magnetooptical recording medium at a desired linear velocity. Thus, the magnetooptical recording medium can be heated with a temperature gradient as shown in FIG. 21B during a reproducing operation.

The present invention will now be described in detail illustrating specific experimental examples. However, the present invention is not limited to the following experimental examples, provided that the gist of the invention is maintained.

(First Embodiment)

Figure 2:
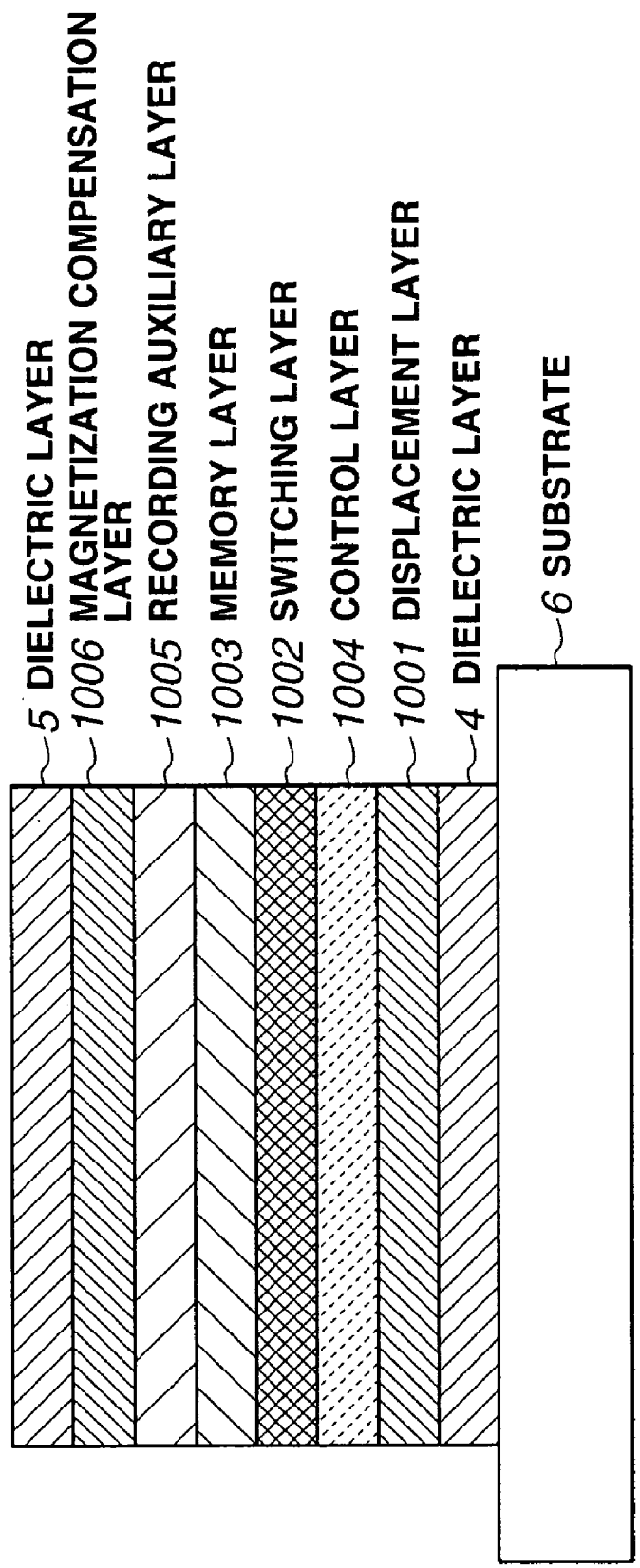
FIG. 2 is a schematic cross-sectional view illustrating the configuration of layers of a magnetooptical recording medium according to a first embodiment of the present invention.

FIG. 2 is a schematic cross-sectional view illustrating a magnetooptical recording medium according to a first embodiment of the present invention. In FIG. 2, a dielectric layer 4, a displacement layer 1001, a control layer 1004, a switching layer 1002, a memory layer 1003, a recording auxiliary layer 1005, a magnetization compensation layer 1006, and a dielectric layer 5 are sequentially laminated on a substrate 6. The magnetization compensation layer 1006 has a composition such that iron-family-element sub-lattice magnetization is dominant at the room temperature, and is subjected to exchange coupling with the recording auxiliary layer 1005 that is provided as a new magnetic layer in the first embodiment. The magnetization compensation layer 1005 is laminated at this position in order to prevent adverse influence on a recording mechanism. In order to prevent adverse influence on the thermal structure of the medium, the magnetization compensation layer 1006 comprises a magnetic film having large anisotropy in order to be able to maintain large magnetization with a small thickness. More specifically, for example, a TbFeCo- or TbDyFeCo-type magnetic layer may be used.

EXPERIMENTAL EXAMPLE 1

Targets made of B-doped Si, Gd, Tb, FeCr and CoCr were mounted in a DC magnetron sputtering apparatus. After fixing a polycarbonate substrate having a track pitch of 0.54 μm where servo pits for tracking are formed, on a substrate holder, the inside of a chamber of the apparatus was evacuated to a high vacuum equal to or less than $2 \times 10^{-5}$ Pa. Then, Ar gas was introduced into the chamber while evacuating the inside of the chamber, and the respective layers were formed by sputtering the corresponding targets while rotating the substrate. A SiN layer was formed according to DC reactive sputtering while introducing $N_2$ gas in addition to the Ar gas.

First, the pressure within the chamber was set to a desired value according to conductance adjustment while causing the Ar gas and the $N_2$ gas to flow within the chamber, and a SiN layer, serving as the dielectric layer 4, was formed to a thickness of 35 nm. If the $N_2$ gas is mixed during formation of a magnetic film, for example, nitriding occurs, thereby influencing magnetic characteristics. Accordingly, the dielectric layers and other magnetic layers were formed in separate chambers. After forming the dielectric layer 4, the substrate 6 was conveyed to another chamber. A desired pressure was obtained by conductance adjustment while introducing Ar gas, and GdFeCoCr layers having different composition ratios, each having a thickness of 18 nm, were formed to provide the displacement layer 1001. Then, after obtaining a desired pressure by conductance adjustment using the Ar gas, a TbFeCoCr layer having a thickness of 18 nm, serving as the control layer 1004, a TbFeCr layer having a thickness of 10 nm, serving as the switching layer 1002, and a TbFeCoCr layer having a thickness of 60 nm, serving as the memory layer 1003, were successively formed. Then, a GdFeCoCr layer having a thickness of 20 nm, serving as the recording auxiliary layer 1005, was formed.

Then, the sputtering process gas was switched from Ar to Kr. After obtaining a desired pressure according to conductance adjustment, a TbFeCoCr layer having a thickness of 30 nm, serving as the magnetization compensation layer 1006, was formed.

Finally, a SiN layer having a thickness of 50 nm, serving as the dielectric layer 5, was formed according to DC reactive sputtering, as in the case of forming the dielectric layer 4.

The composition ratio of each of the magnetic layers was controlled by changing the ratio of power applied to a corresponding one of the Gd, Tb, FeCr and CoCr targets. The composition ratio for each of the magnetic layers other than the magnetization compensation layer 1006 was adjusted so as to provide a composition as close to a compensated composition as possible. More preferably, the composition ratio was adjusted so as to provide a state in which rare-earth elements are dominant at room temperature, in order that rare-earth elements and iron-family elements are compensated at a temperature near the Curie temperature of the switching layer 1002, i.e., a reproducing temperature.

More specifically, the Curie temperature of the displacement layer 1001 was adjusted to about 250 (the switching layer 1002 side)–290° C. (the substrate 6 side), the Curie temperature of the control layer 1004 was adjusted to about 170° C., the Curie temperature of the switching layer 1002 was adjusted to about 160° C., the Curie temperature of the memory layer 1003 was adjusted to 330° C., and the Curie temperature of the recording auxiliary layer 1005 was adjusted to about 380° C.

Figure 3:
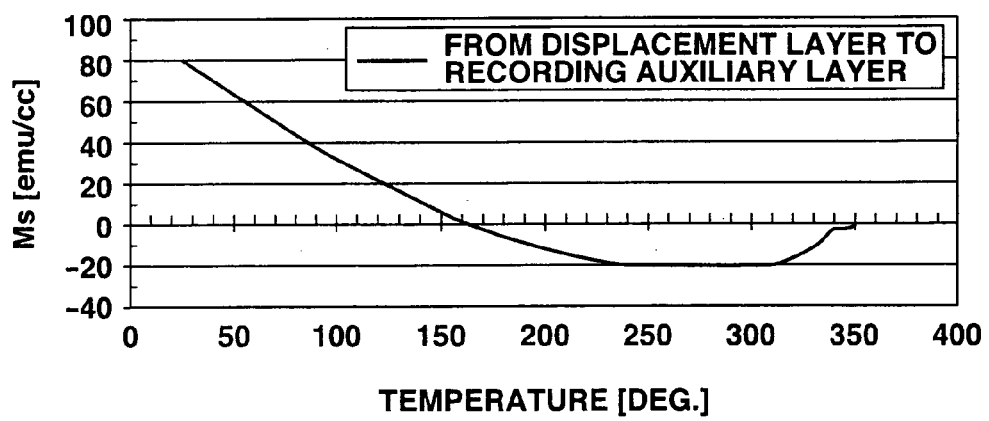
FIG. 3 is a graph illustrating the temperature dependency of total magnetization when magnetic layers from a displacement layer to a recording auxiliary layer are laminated, in Experimental Example 1 of the present invention.

FIG. 3 illustrates the temperature dependency of total magnetization when the magnetic layers from the displacement layer 1001 to the recording auxiliary layer 1005 are laminated. The temperature dependency of magnetization was measured for another sample prepared using a glass substrate. Film forming conditions were the same as for the above-described sample for evaluating dynamic characteristics. Before measuring the sample, initialization processing was performed using a bulk eraser. Thereafter, the temperature dependency of magnetization Ms was measured by a vibrating-sample-type magnetometer (VSM).

Figure 4:
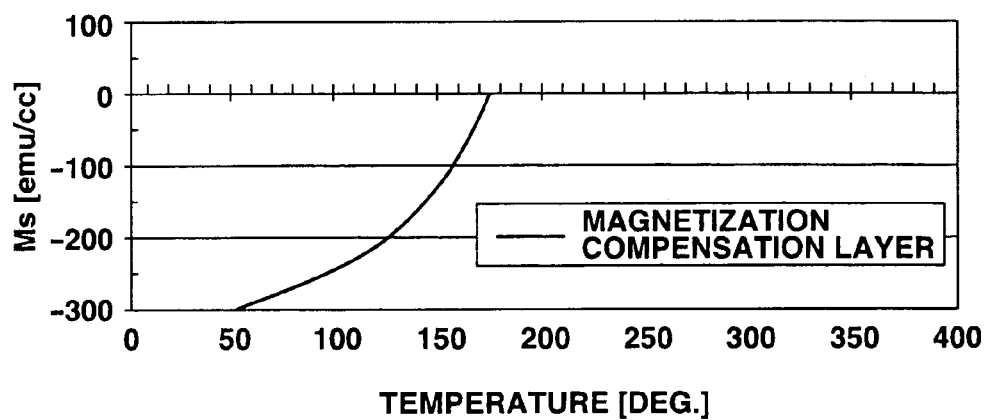
FIG. 4 is a graph illustrating the temperature dependency of magnetization of a magnetization compensation layer in Experimental Example 1.

The result of measurement indicates that the total magnetization of the magnetic layers becomes substantially zero at a temperature near 165° C. Accordingly, the Curie temperature of the magnetization compensation layer 1006 of Experimental Example 1 was adjusted to 175° C. The temperature dependency of magnetization is shown in FIG. 4.

Figure 5:
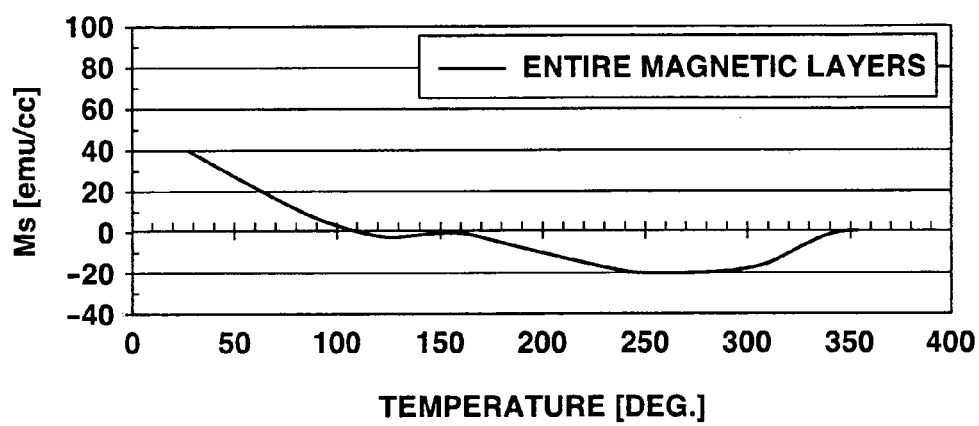
FIG. 5 is a graph illustrating the temperature dependency of total magnetization when magnetic layers from a displacement layer to a magnetization compensation layer are laminated, in Experimental Example 1.

FIG. 5 illustrates the temperature dependency of magnetization when all of the magnetic layers from the displacement layer 1001 to the magnetization compensation layer 1006 in Experimental Example 1 were laminated. FIG. 5 indicates that total magnetization has very small values by being compensated at temperatures equal to or lower than the Curie temperature of the switching layer 1002, i.e., the reproducing temperature, particularly at the room temperature. That is, it is possible to suppress the floating magnetic field from surrounding portions operating on domain walls of the displacement layer 1001 (mainly, the floating magnetic field from magnetization of adjacent recording tracks at temperatures near the room temperature), and to smoothly perform domain wall displacement.

The dynamic characteristics of samples in Experimental Example 1 that were formed in the above-described manner were evaluated using the optical-disk recording/reproducing apparatus having the optical system shown in FIG. 20. Before the evaluation, only portions of the magnetic films between recording tracks were locally annealed by continuously irradiating a condensed laser beam within a range of power of about 6–9 mW by rotating the medium at a linear velocity of 4.5 m/sec, using an apparatus having a laser wavelength of 408 nm, and a NA of an objective of 0.80. According to this processing, magnetization of portions of the magnetic films between recording tracks is degraded, such that the domain wall energy is not accumulated at these portions. A portion optimum from the viewpoint of jitter characteristics was selected from the portions between tracks that were locally annealed by changing the power of laser in the above-described manner, and measurement of recording/reproduction was performed.

Recording was performed by transferring a pattern of upwardly magnetized regions and downwardly magnetized regions corresponding to modulation of the magnetic field from the recording auxiliary layer 1005, in a cooling process after heating the medium at a temperature equal to or higher than the Curie temperature of the memory layer 1003 by performing DC irradiation of laser. The intensity of the modulated magnetic field was 300 Oe.

Optimum recording power was selected by changing the power of the condensed laser beam within a range of about 2–8 mW while rotating the medium at a linear velocity of 2.4 m/sec. Similarly, optimum reproducing power of laser was also selected by changing the power of laser within a range of about 1–4 mW.

The values of optimum power were 7.4 mW for annealing, 4.6 mW for recording, and 2.4 mW for reproduction. In these optimum conditions, in order to study influence by the stray magnetic field from two adjacent tracks in a tone pattern signal having a shortest mark length of 0.107 µm with a linear recording density of 0.08 µm/bit using a (1–7) RLL (run length limited) modulation method, DC magnetization was performed for two adjacent tracks of a recording track, and a change in the width of reproduced pulses due to different polarities was studied.

The results of the study indicate that, even when influence by the floating magnetic field was greatly changed by changing the polarity by reversing the direction of magnetization as positive/negative (upward/downward) in two adjacent tracks of a recording track, the amount of change of the width of reproduced pulses in the recording track was only 0.21 ns. That is a very small value of about 0.9% with respect to the window width of 22.22 ns. The jitter value at a rise of the waveform of a reproduced signal; i.e., a jitter value at POS polarity, at that time was 3.20 ns.

The result of measurement of the BER (bit error rate) in recording of a random pattern signal with a linear recording density of 0.08 µm/bit using the (1–7) RLL modulation method indicates that the BER had excellent values equal to or less than 3.0 E−5 in any cases irrespective of the direction of magnetization in two adjacent tracks of a recording track.

As described above, in the magnetooptical recording medium of Experimental Example 1, it was clear that influence by the stray magnetic field from two adjacent tracks during the reproducing operation was very small, and that an excellent reproducing operation can be conducted with a low error rate with which an error in a reproducing operation is hardly produced.

EXPERIMENTAL EXAMPLE 2

Samples were manufactured in the same manner as in Experimental Example 1, except that the Curie temperature was changed to various values in the magnetization compensation layer 1006.

It was clear that in the manufactured samples, if the Curie temperature of the magnetization compensation layer 1006 departed from a temperature range of ±20° C. with respect to a temperature where total magnetization when the magnetic layers from the displacement layer 1001 to the recording auxiliary layer 1005 are laminated is substantially zero, compensation of total magnetization in all the magnetic layers (including the magnetization compensation layer 1006) is not sufficient in a temperature range from the room temperature to a temperature near the Curie temperature of the switching layer 1002, i.e., a reproducing temperature. As a result, the medium is influenced by the stray magnetic field from adjacent tracks and the like, and a stable reproducing operation cannot be performed.

EXPERIMENTAL EXAMPLE 3

Samples were manufactured in the same manner as in Experimental Example 1, except that the thickness was changed to various values in the magnetization compensation layer 1006.

It was clear that in the manufactured samples, if the thickness of the magnetization compensation layer 1006 exceeds 25% with respect to the total thickness when the magnetic layers from the displacement layer 1001 to the recording auxiliary layer 1005 are laminated, excellent recording/reproducing characteristics cannot be obtained due probably to a change in thermal structure. It was also clear that, if the thickness of the magnetization compensation layer 1006 is less than 15% of the total thickness, compensation of total magnetization in all the magnetic layers is not sufficient in a temperature range from room temperature to a temperature near the Curie temperature of the switching layer 1002, i.e., the reproducing temperature. As a result, the medium is influenced by the stray magnetic field from adjacent tracks and the like, and a stable reproducing operation cannot be performed.

COMPARATIVE EXAMPLE 1

In Comparative Example 1, samples were made in the same manner manufactured as in Experimental Example 1 except that the magnetization compensation layer 1006 was removed, and the recording/reproducing characteristics of the samples were evaluated.

The results of the evaluation indicate that, when influence by the stray magnetic field was greatly changed by changing the polarity by reversing the direction of magnetization as positive/negative (upward/downward) in two adjacent tracks of a recording track, the amount of change of the width of reproduced pulses in the recording track was 2.47 ns. That is a very large value of about 11.1% with respect to the window width of 22.22 ns. The jitter value at a rise of the waveform of a reproduced signal, i.e., a jitter value at POS polarity, at that time was 3.25 ns.

The result of measurement of the BER in recording of a random pattern signal with a linear recording density of 0.08 μm/bit using the (1–7) RLL modulation method indicates that the BER had poor values of about 5.0 E–4 in all cases irrespective of the direction of magnetization in two adjacent tracks of a recording track.

As described above, in the magnetooptical recording medium of Comparative Example 1, it was clear that since variations in the width of reproduced pulses due to influence of the stray magnetic field from two adjacent tracks during a reproducing operation are produced, the measured BER values degrade, and a stable reproducing operation cannot be performed because an error tends to be produced in the reproducing operation.

The temperature dependency of the magnetization of all the magnetic layers in Comparative Example 1 was the same as in Experimental Example 1 shown in FIG. 3.

COMPARATIVE EXAMPLE 2

In Comparative Example 2, the recording-magnetic-field sensitivity was improved by changing the composition of the memory layer 1003. More specifically, by shifting the composition of the memory layer 1003 to a state in which transition-metal sub-lattice magnetization is dominant, the amount of magnetization at a high temperature range was increased, to improve the recording-magnetic-field sensitivity. Samples were manufactured as in the same manner in Comparative Example 1 in other conditions, and the recording/reproducing characteristics of the samples were evaluated.

Figure 6:
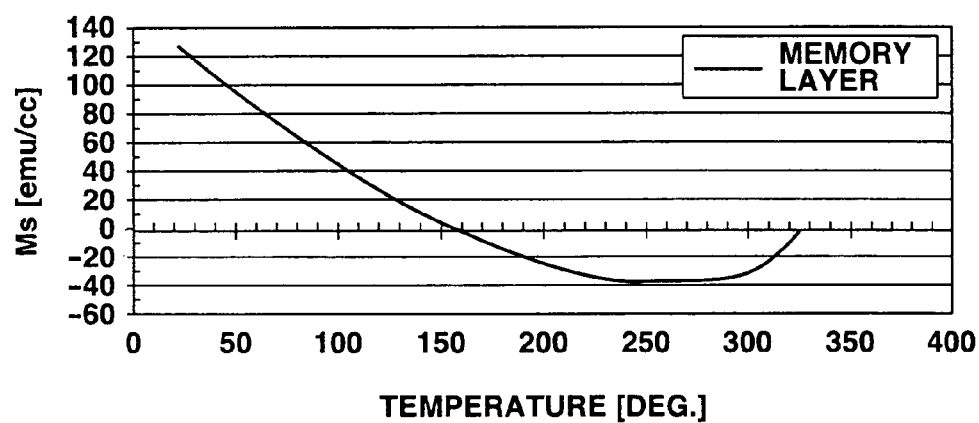
FIG. 6 is a graph illustrating the temperature dependency of magnetization of a memory layer in Comparative Example 1 of the present invention.
Figure 7:
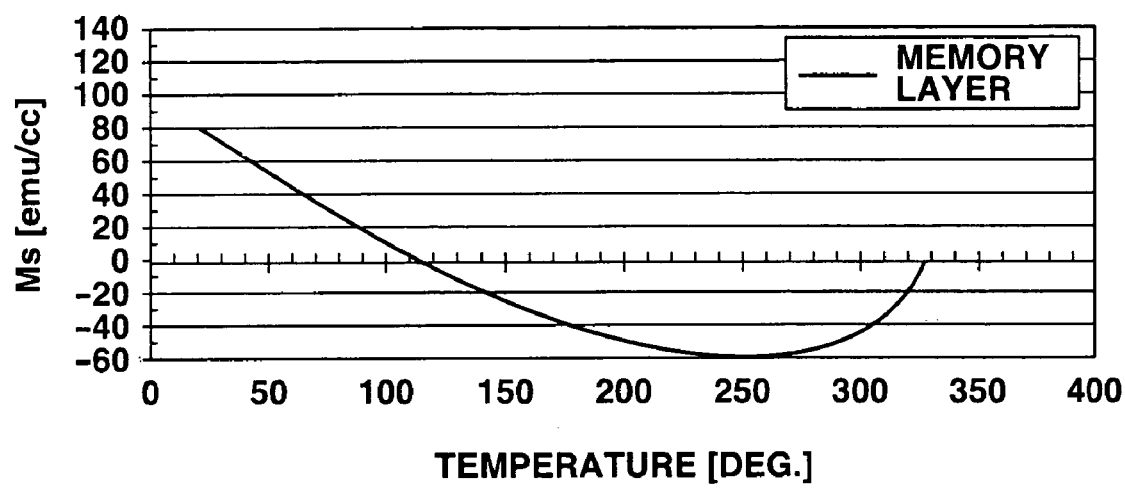
FIG. 7 is a graph illustrating the temperature dependency of magnetization of a memory layer in Comparative Example 2 of the present invention.
Figure 8:
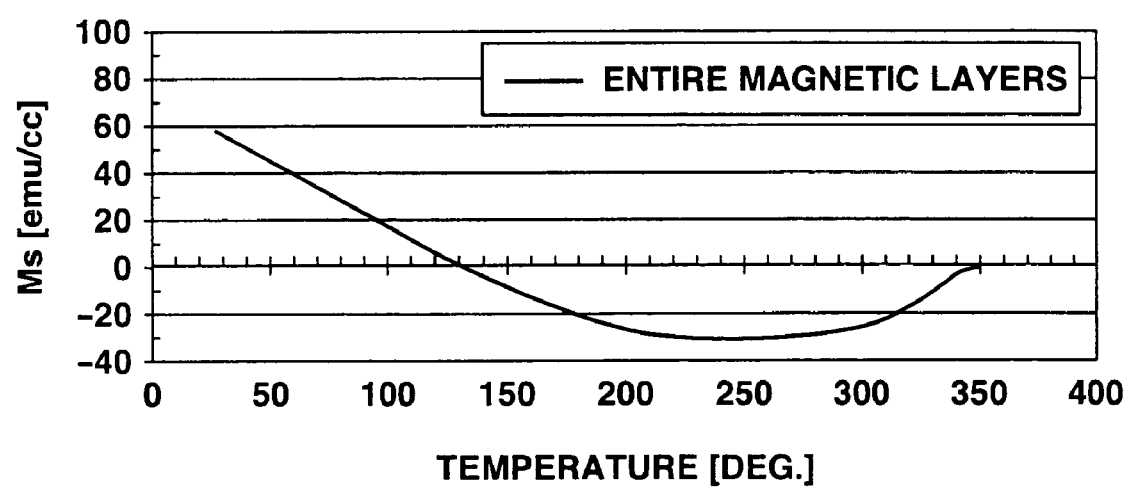
FIG. 8 is a graph illustrating the temperature dependency of total magnetization when all magnetic layers are laminated, in Comparative Example 2.

FIGS. 6 and 7 illustrate the temperature dependency of magnetization in the memory layer 1003 before and after changing the composition (Comparative Example 1 and Comparative Example 2), respectively. It can be understood from FIGS. 6 and 7 that in the memory layer 1003 of Comparative Example 2, although the amount of magnetization at a high temperature region can be increased, the amount of magnetization also increases at a region near the Curie temperature of the switching layer 1002, i.e., the reproducing temperature, as described above. Accordingly, as shown in FIG. 8, magnetization also increases at a temperature near the reproducing temperature when all the magnetic layers are laminated. As described above, in a medium in which the recording-magnetic-field sensitivity is improved, influence by the stray magnetic field from the memory layer 1003 at the reproducing temperature cannot be neglected.

The recording-magnetic-field sensitivity (with a 0.107 μm tone pattern signal) was improved to 140 Oe in Comparative Example 2 in contrast to 200 Oe in Comparative Example 1.

The results also indicate that, when influence by the stray magnetic field was greatly changed by changing the polarity by reversing the direction of magnetization as positive/negative (upward/downward) in two adjacent tracks of a recording track, the amount of change of the width of reproduced pulses in the recording track was 3.11 ns. That is about 14.0% with respect to the window width of 22.22 ns, and is a value larger than in Comparative Example 1.

The results of measurement of the BER in recording of a random pattern signal with a linear recording density of 0.08 μm/bit using the (1–7) RLL modulation method indicate that the BER has very poor values of about 8.0 E–4 in all cases irrespective of the direction of magnetization in two adjacent tracks of a recording track.

As described above, in the magnetooptical recording medium of Comparative Example 2, it was clear that, since influence by the stray magnetic field from two adjacent tracks during a reproducing operation is large as in Comparative Example 1, a stable reproducing operation cannot be performed because an error tends to be produced in a reproducing operation.

EXPERIMENTAL EXAMPLE 4

Samples were manufactured in the same manner as in Comparative Example 2, except that a magnetization compensation auxiliary layer in which rare-earth-element sub-lattice magnetization is dominant at the room temperature and that has a Curie temperature higher than the Curie temperature of the magnetization compensation layer was provided.

Figure 9:
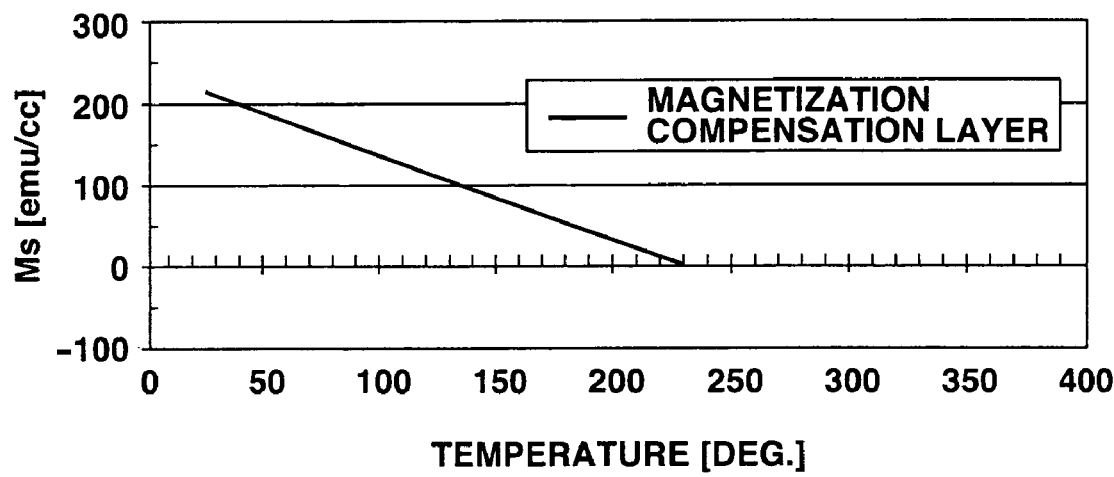
FIG. 9 is a graph illustrating the temperature dependency of magnetization of a magnetization compensation auxiliary layer in Experimental Example 4 of the present invention.
Figure 10:
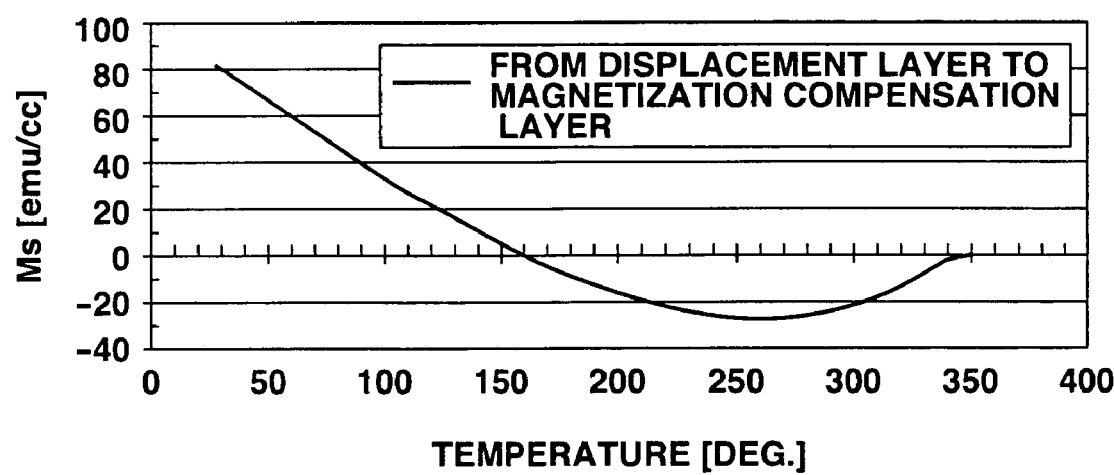
FIG. 10 is a graph illustrating the temperature dependency of total magnetization when magnetic layers from a displacement layer to a magnetization compensation auxiliary layer are laminated, in Experimental Example 4 of the present invention.

More specifically, the Curie temperature of the magnetization compensation auxiliary layer was adjusted to about 230° C. FIG. 9 illustrates the temperature dependency of magnetization. FIG. 10 illustrates the temperature dependency of total magnetization when the magnetic layers from the displacement layer to the magnetization compensation auxiliary layer were laminated.

Figure 11:
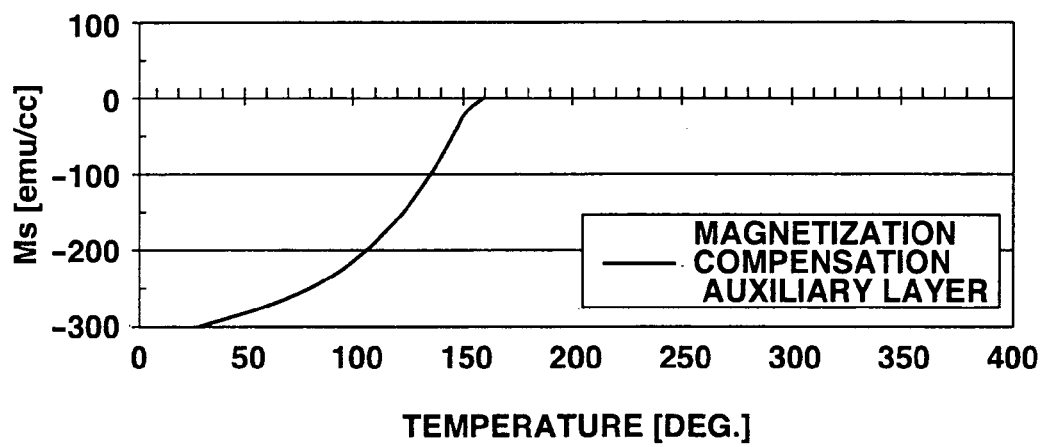
FIG. 11 is a graph illustrating the temperature dependency of magnetization of a magnetization compensation layer in Experimental Example 4.
Figure 12:
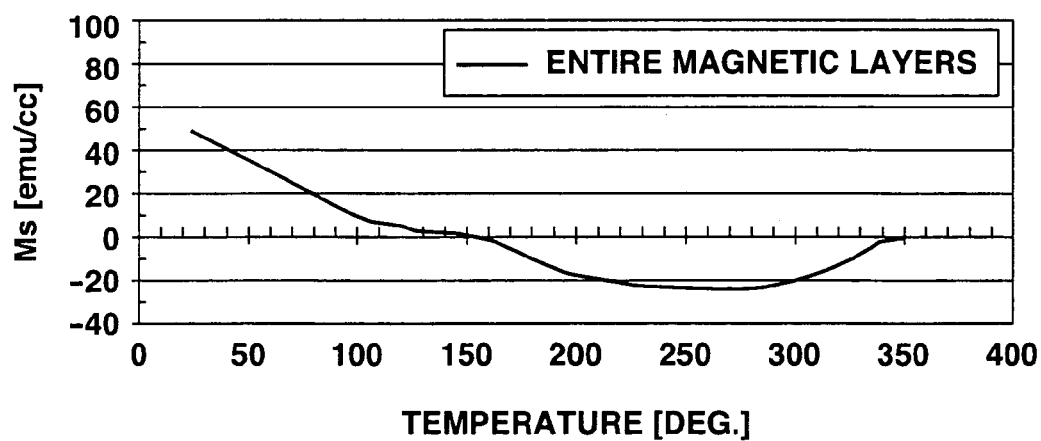
FIG. 12 is a graph illustrating the temperature dependency of total magnetization when all magnetic layers are laminated, in Experimental Example 4.

FIG. 10 indicates that the total magnetization of the magnetic layers becomes substantially zero at a temperature near 160° C. Accordingly, the Curie temperature of the magnetization compensation layer of Experimental Example 4 was adjusted to 160° C. The temperature dependency of magnetization is shown in FIG. 11. FIG. 12 illustrates the temperature dependency of magnetization when all of the magnetic layers from the displacement layer to the magnetization compensation layer were laminated. FIG. 12 indicates that magnetization has very small values when compensated at temperatures close to the Curie temperature of the switching layer, i.e., the reproducing temperature, and at a temperature region from the room temperature to the Curie temperature. That is, in Experimental Example 4, the magnetization compensation auxiliary layer operates to compensate total magnetization (mainly, magnetization of the memory layer) at a temperature close to the reproducing temperature, and the magnetization compensation layer operates to compensate total magnetization from the room temperature to a temperature close to the reproducing temperature.

The dynamic characteristics of samples in Experimental Example 4 that were formed in the above-described manner were evaluated as in Experimental Example 1.

The results of the evaluation indicate that, even when influence by the stray magnetic field was greatly changed by changing the polarity by reversing the direction of magnetization as positive/negative in two adjacent tracks of a recording track, the amount of change of the width of reproduced pulses in the recording track was only 0.28 ns. That is a very small value of about 1.3% with respect to the window width of 22.22 ns. The jitter value at a rise of the waveform of a reproduced signal, i.e., a jitter value at POS polarity, at that time was 3.28 ns.

The result of measurement of the BER in recording of a random pattern signal with a linear recording density of 0.08 μm/bit using the (1–7) RLL modulation method indicates that the BER had excellent values of about 2.0 E−5 in all cases irrespective of the direction of magnetization in two adjacent tracks of a recording track.

As described above, in the magnetooptical recording medium of Experimental Example 4, it was clear that influence by the stray magnetic field from two adjacent tracks during a reproducing operation is very small, and an excellent reproducing operation can be performed with a low error rate with which an error in a reproducing operation is hardly produced.

EXPERIMENTAL EXAMPLE 5

Samples were manufactured in the same manner as in Experimental Example 4, except that the Curie temperature was changed to various values in the magnetization compensation layer and the magnetization compensation auxiliary layer.

It was clear that in the manufactured samples, if the Curie temperature of the magnetization compensation auxiliary layer departs from a temperature range of ±20° C. with respect to a temperature range from a temperature equal to or lower than the Curie temperature of the displacement layer to a temperature equal to or higher than the Curie temperature of the switching layer, and a temperature where total magnetization when the magnetic layers from the displacement layer to the magnetization compensation auxiliary layer are laminated becomes substantially zero, compensation of total magnetization in all the magnetic layers (including the magnetization compensation layer) is not sufficient in a temperature range from room temperature to a temperature near the Curie temperature of the switching layer, i.e., the reproducing temperature. As a result, the medium is influenced by the stray magnetic field from adjacent tracks and the like, and a stable reproducing operation cannot be performed.

EXPERIMENTAL EXAMPLE 6

Samples were manufactured in the same manner as in Experimental Example 4, except that the thickness was changed to various values in the magnetization compensation layer and the magnetization compensation auxiliary layer.

It was clear that in the manufactured samples, if the thickness of the magnetization compensation layer is less than 15% with respect to the total thickness when the magnetic layers from the displacement layer to the recording auxiliary layer are laminated, compensation of total magnetization is not sufficient, and dependency on the state of magnetization of two adjacent tracks is pronounced. At thicknesses equal to or larger than 25% of the total thickness, excellent recording/reproducing characteristics cannot be obtained probably by the influence of a change in the thermal structure.

Although an embodiment and comparative examples of the present invention have been described, the magnetic recording medium of the present invention may be reproduced by detecting another change caused by displacement of domain walls, instead of detecting a change in a plane of polarization due to the magnetooptical effect. Furthermore, the boundary of adjacent magnetic layers is not necessarily clear and sharp, and a gradient configuration in which characteristics gradually change in the direction of the thickness may also be adopted.

(Second Embodiment)

Figure 22:
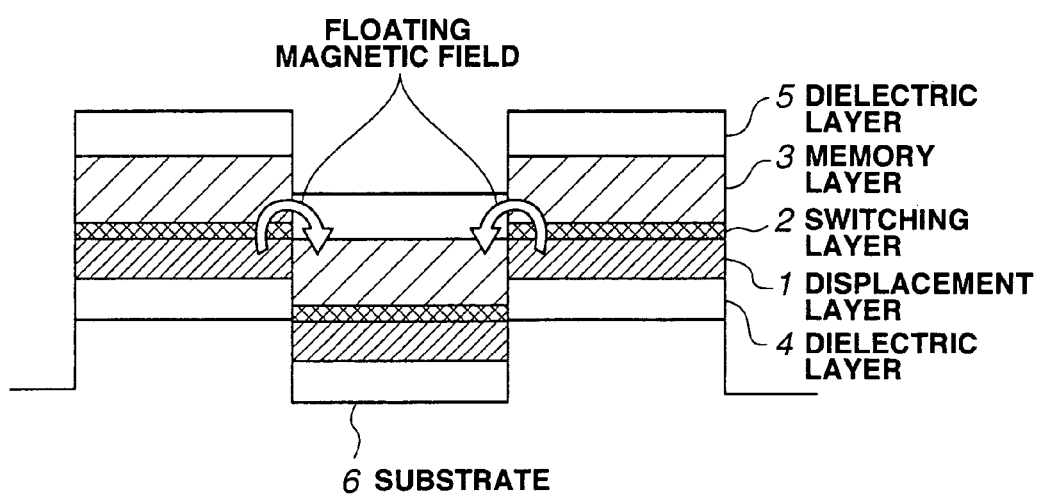
FIG. 22 is a diagram illustrating the influence of a floating magnetic field during a recording operation in a land/groove substrate.

In the first embodiment, a configuration in which the magnetization compensation layer is provided as a new, separate layer was illustrated. In a second embodiment of the present invention, a configuration in which a portion of a multilayered displacement layer functions as a magnetization compensation layer will be illustrated. The magnetization compensation layer in the second embodiment operates to compensate the magnitude of magnetization at least at room temperature, preferably in the entire temperature range from room temperature to the Curie temperature of the switching layer, and has a composition such that iron-family element sub-lattice magnetization is dominant at room temperature. In this case, although magnetization is compensated only in the displacement layer, a sufficient effect can be obtained since the displacement layer is close to a reproducing portion. In a recording operation, in a land/groove recording method shown in FIG. 22, it is also possible to provide a sufficient effect since influence by the stray magnetic field from the displacement layer above adjacent land portions can be mitigated.

EXPERIMENTAL EXAMPLE 7

Figure 13:
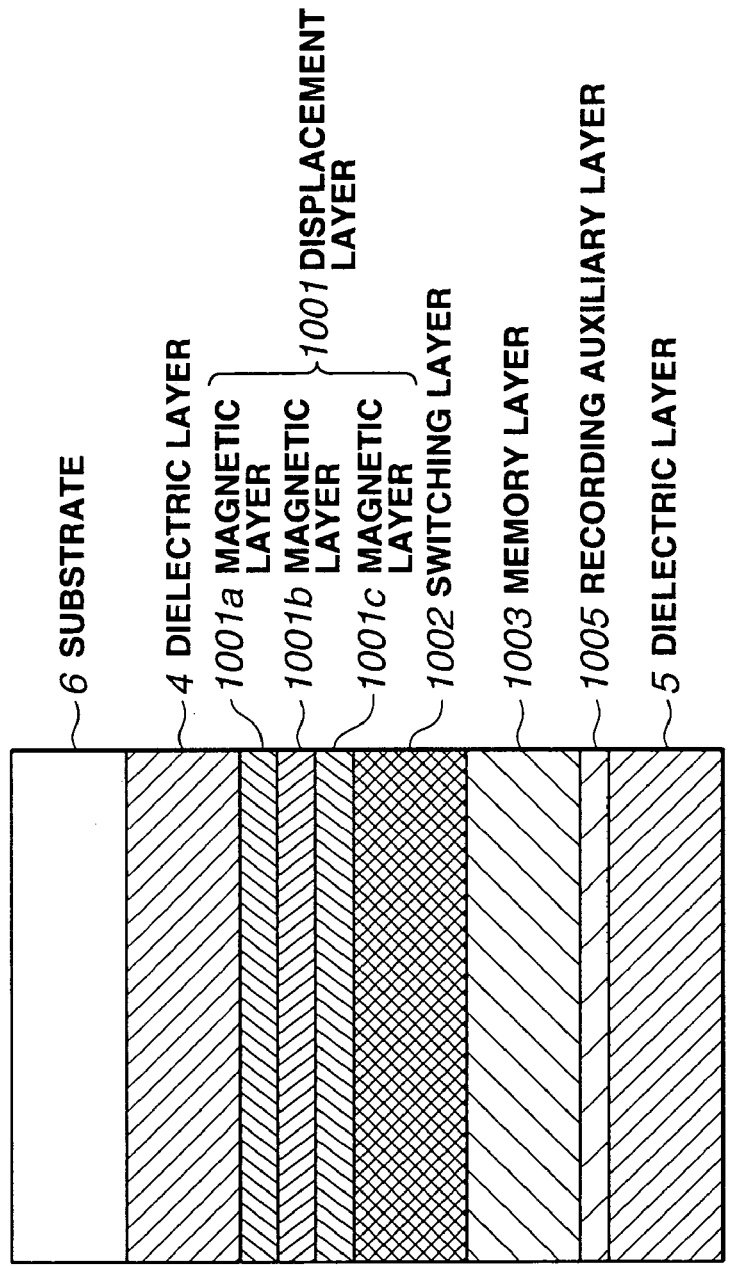
FIG. 13 is a schematic cross-sectional view illustrating the configuration of layers of a magnetooptical recording medium in Experimental Example 7 of the present invention.

FIG. 13 is a schematic cross-sectional view illustrating the configurations of basic layers of a magnetooptical recording medium according to the second embodiment. In the second embodiment, a polycarbonate substrate having a land width of 0.6 μm, a groove width of 0.4 μm, and a groove depth of 140 nm was used, and land/groove recording was performed. In Experimental Example 7, a SiN film having a thickness of 35 nm was formed as the dielectric layer 4 according to reactive sputtering using a Si target under the conditions of an Ar gas flow rate of 19 sccm, an $N_2$ gas flow rate of 12.7 sccm, and a sputtering pressure of 0.2 Pa.

Figure 14:
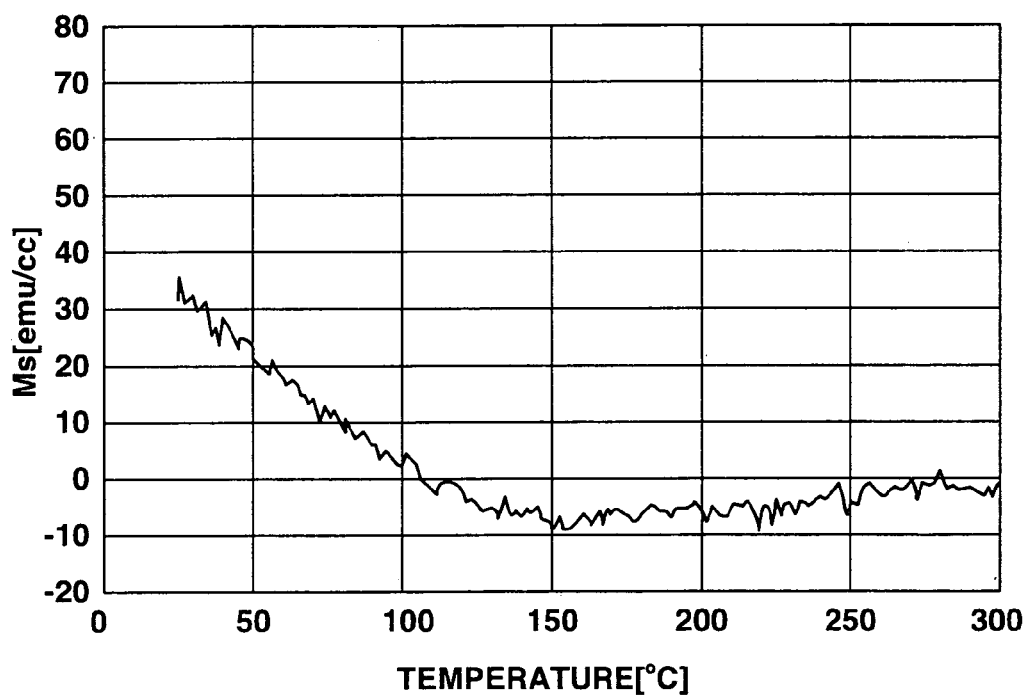
FIG. 14 is a graph illustrating the temperature dependency of total magnetization of a displacement layer in Experimental Example 7.

A displacement layer 1001 was obtained by laminating three layers having different compositions. A GdFeCoCr film 12 nm thick having a Curie temperature of 290° C. in which rare-earth-element sub-lattice magnetization is dominant at the room temperature was formed as a magnetic layer 1001*a*. A GdFeCr film 12 nm thick having a Curie temperature of 240° C. and a compensation temperature of 190° C. in which rare-earth-element sub-lattice magnetization is dominant at room temperature was formed as a magnetic layer 1001*b*. A GdFeCr film 12 nm thick having a Curie temperature of 180° C. in which iron-family-element sub-lattice magnetization is dominant at room temperature was formed as a magnetic layer 1001*c*. FIG. 14 illustrates the temperature dependency of total magnetization of the displacement layer 1001 of Experimental Example 7. By thus changing the composition of the displacement layer 1001 in the direction of the thickness, the total magnetization of the displacement layer 1001 at the room temperature can be reduced, compared with Comparative Example 3 which is described hereinafter.

A vertically-magnetizing TbFeCr film 10 nm thick having the lowest Curie temperature of about 150° C. compared with both the displacement layer 1001 and the memory layer 1003, was formed as the switching layer 1002. A TbFeCoCr film 60 nm thick was formed as the memory layer 1003, and a GdFeCoCr film 20 nm thick was formed as the recording auxiliary layer 1005. A SiN film 50 nm thick was formed as the dielectric layer 5 in the same film forming conditions as for the dielectric layer 4.

The recording-magnetic-field sensitivity of the magnetooptical recording medium having the above-described configuration was measured using the optical system shown in FIG. 20 with a wavelength λ of 650 nm, a numerical aperture NA of an objective 74 of 0.6, and a linear velocity during recording of 2.4 m/s, and by (1–7) modulation with a recording density of 0.080 μm/bit using a magnetic-field generating coil 80. The measurement results indicate that in the magnetooptical recording medium of Experimental Example 7, recording characteristics saturate at a land portion with an external magnetic field of 200 Oe, and a bit error rate of 4E–5 was obtained. Recording characteristics saturate at a groove portion with an external magnetic field of 220 Oe, and a bit error rate of 4E–5 was obtained. The recording-magnetic-field sensitivity of groove portions was greatly improved compared with the magnetooptical recording medium in Comparative Example 3 which is described hereinafter.

EXPERIMENTAL EXAMPLE 8

Figure 15:
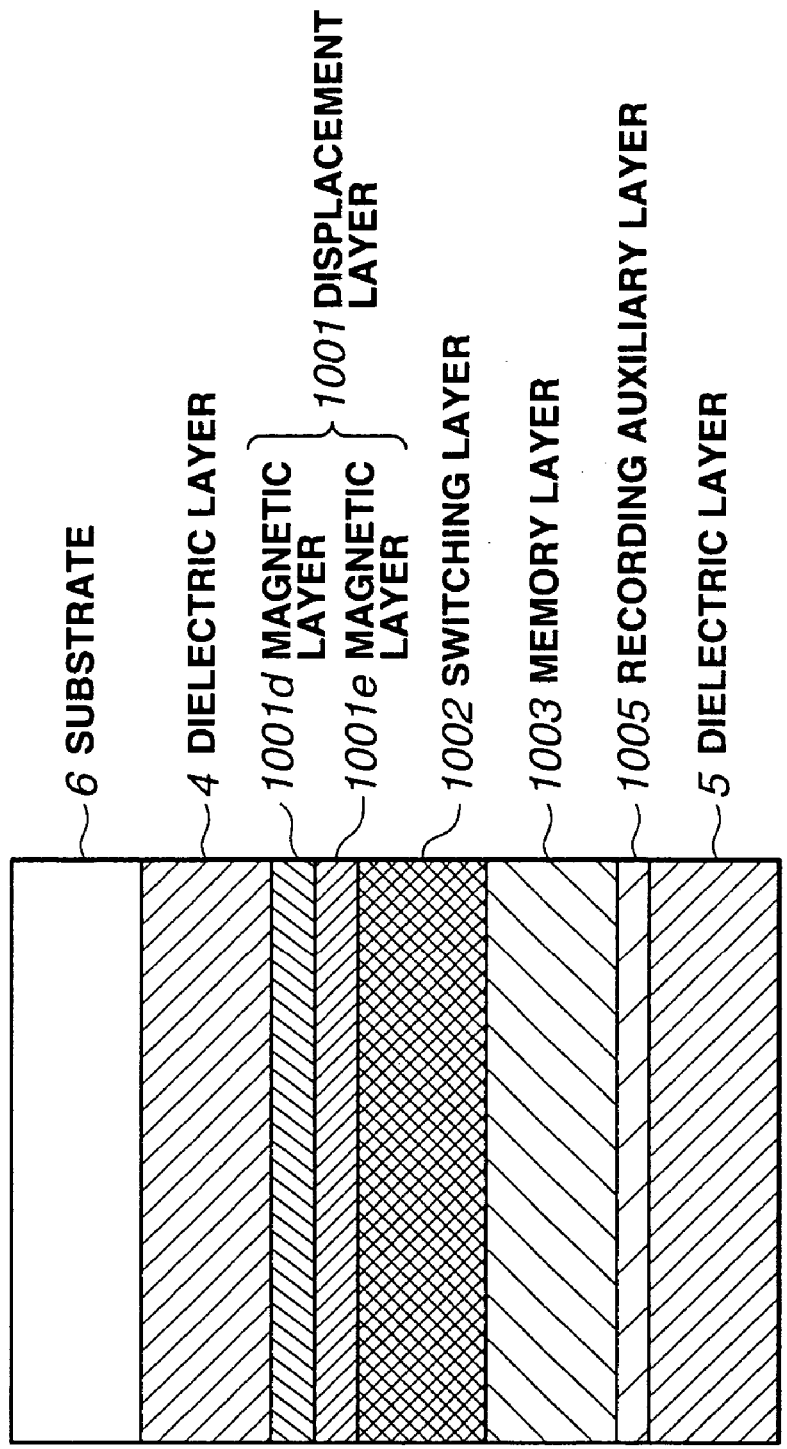
FIG. 15 is a schematic cross-sectional view illustrating the configuration of layers of a magnetooptical recording medium in Experimental Example 8 of the present invention.
Figure 16:
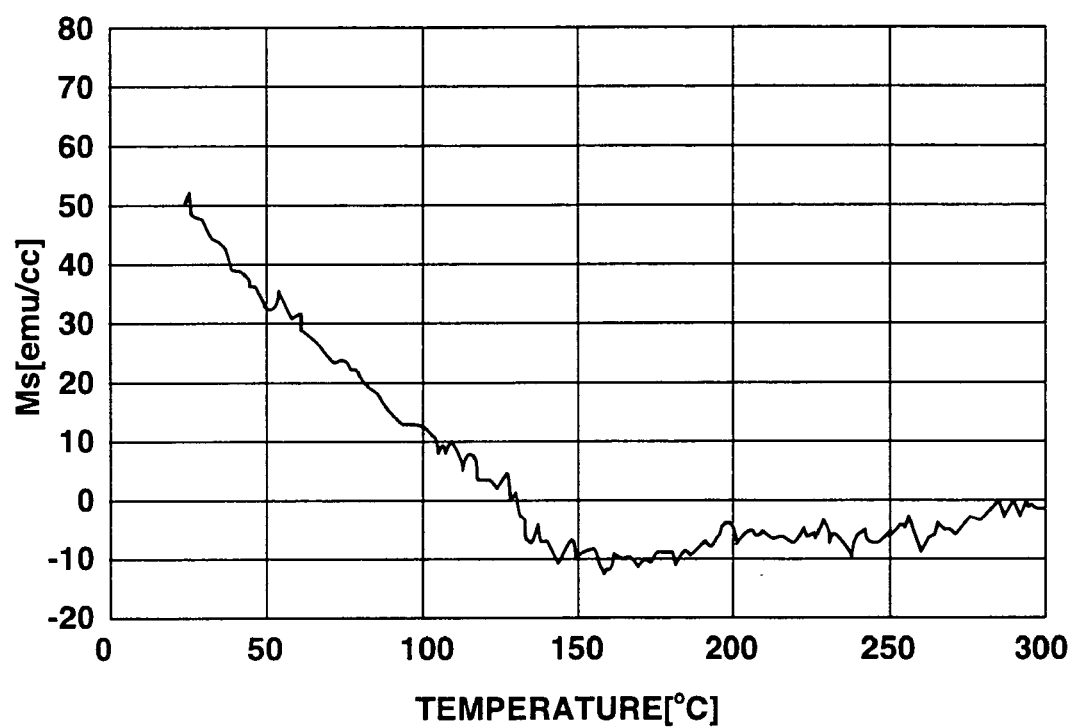
FIG. 16 is a graph illustrating the temperature dependency of total magnetization of a displacement layer in Experimental Example 8.

FIG. 15 is a cross-sectional view illustrating a modification of the second embodiment, as Experimental Example 8 of the present invention. The configuration of this magnetooptical recording medium has the same configuration as in Experimental Example 7, except that the configuration of the displacement layer was changed. A displacement layer 1001 was obtained by laminating two layers having different compositions. A GdFeCoCr film 18 nm thick having a Curie temperature of 290° C. in which rare-earth-element sub-lattice magnetization is dominant at the room temperature was formed as a magnetic layer 1001*d*, and a GdFeCr film 18 nm thick having a Curie temperature of 200° C. and a compensation temperature of 20° C. in which iron-family-element sub-lattice magnetization is dominant at the room temperature was formed as a magnetic layer 1001*e*. FIG. 16 illustrates the temperature dependency of the total magnetization of the displacement layer 1001 of Experimental Example 8. As shown in FIG. 16, in Experimental Example 8, the total magnetization of the displacement layer 1001 at the room temperature can be reduced.

The evaluation of recording/reproducing signals as in Experimental Example 7 was performed for the magnetooptical recording medium having the above-described configuration. The evaluation results indicate that as for the recording-magnetic-field sensitivity by (1–7) modulation with a recording density of 0.080 μm/bit, recording characteristics saturate at a land portion at an external magnetic field of 200 Oe, and a bit error rate of 5E–5 was obtained. Recording characteristics saturate at a groove portion with an external magnetic field of 250 Oe, and a bit error rate of 5E–5 was obtained. The recording-magnetic-field sensitivity of groove portions was greatly improved compared with the magnetooptical recording medium in the Comparative Example 3.

COMPARATIVE EXAMPLE 3

Figure 18:
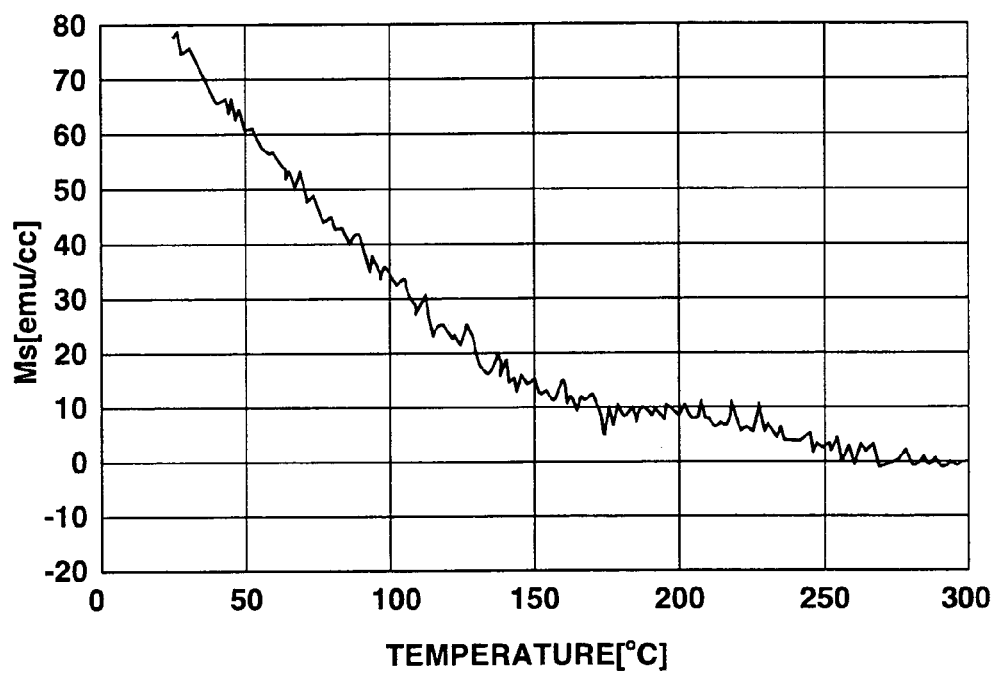
FIG. 18 is a graph illustrating the temperature dependency of total magnetization of a displacement layer in Comparative Example 3 of the present invention.

The configuration of a magnetooptical recording medium of Comparative Example 3 has the same configuration as in Experimental Example 8, except that the configuration of the displacement layer was changed. A displacement layer 1001 was obtained by laminating two layers having different compositions. A GdFeCoCr film 18 nm thick having a Curie temperature of 290° C. in which rare-earth-element sub-lattice magnetization is dominant at the room temperature was formed as a magnetic layer 1001*d*, and a GdFeCr film 18 nm thick having a Curie temperature of 210° C. in which rare-earth-element sub-lattice magnetization is dominant at the room temperature was formed as a magnetic layer 1001*e*. FIG. 18 illustrates the temperature dependency of the total magnetization of the displacement layer 1001 of Comparative Example 3. As shown in FIG. 18, in Comparative Example 3, the total magnetization of the displacement layer 1001 at the room temperature was increased compared with Experimental Example 7 and Experimental Example 8.

The evaluation of recording/reproducing signals as in Experimental Example 7 was performed for the magnetooptical recording medium having the above-described configuration. The evaluation results indicate that as for the recording-magnetic-field sensitivity by (1–7) modulation with a recording density of 0.080 μm/bit, recording characteristics saturate at a land portion at an external magnetic field of 200 Oe as in Experimental Example 7, and a bit rate of 1E–4 was obtained. Recording characteristics saturate at a groove portion at an external magnetic field of 350 Oe, and a bit error rate of 1E–4 was obtained. Accordingly, the recording-magnetic-field sensitivity of groove portions was degraded. As described above, in the magnetooptical recording medium of Comparative Example 3, the recording-magnetic-field sensitivity is degraded by being influenced by the stray magnetic field from displacement layers on land portions of adjacent tracks during recording in a groove portion.

EXPERIMENTAL EXAMPLE 9

Figure 17:
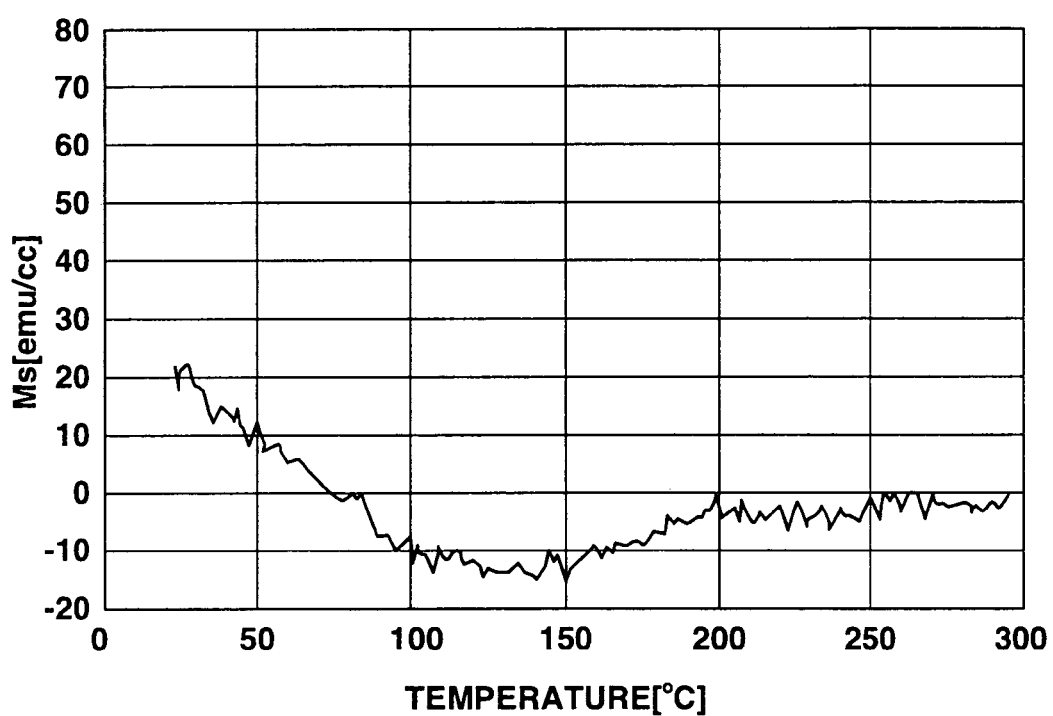
FIG. 17 is a graph illustrating the temperature dependency of total magnetization of a displacement layer in Experimental Example 9 of the present invention.

The configuration of a magnetooptical recording medium of Experimental Example 9 has the same configuration as in Experimental Example 7, except that the composition and the thickness of the displacement layer were changed. A GdFeCoCr film 10 nm thick having a Curie temperature of 290° C. in which rare-earth-element sub-lattice magnetization is dominant at the room temperature was formed as the magnetic layer 1001a, a GdFeCr film 10 nm thick having a Curie temperature of 240° C. and a compensation temperature of 235° C. was formed as the magnetic layer 1001b, and a GdFeCr film 16 nm thick having a Curie temperature of 180° C. in which iron-family-element sub-lattice magnetization is dominant at the room temperature was formed as the magnetic layer 1001c. FIG. 17 illustrates the temperature dependency of the total magnetization of the displacement layer 1001 of Experimental Example 9. As shown in FIG. 17, the total magnetization of the displacement layer 1001 at the room temperature could be reduced in Experimental Example 9.

The evaluation of recording/reproducing signals as in Experimental Example 7 was performed for the magnetooptical recording medium of Experimental Example 9. The evaluation results indicate that for the recording-magnetic-field sensitivity by (1–7) modulation with a recording density of 0.080 μm/bit, recording characteristics saturate at a land portion at an external magnetic field of 200 Oe as in Experimental Example 7, and a bit error rate of 5E–5 was obtained. Recording characteristics saturate at a groove portion at an external magnetic field of 200 Oe, and a bit error rate of 5E–5 was obtained. Accordingly, the recording-magnetic-field sensitivity of groove portions was further improved compared with the magnetooptical recording medium of Experimental Example 7.

EXPERIMENTAL EXAMPLE 10

Figure 19:
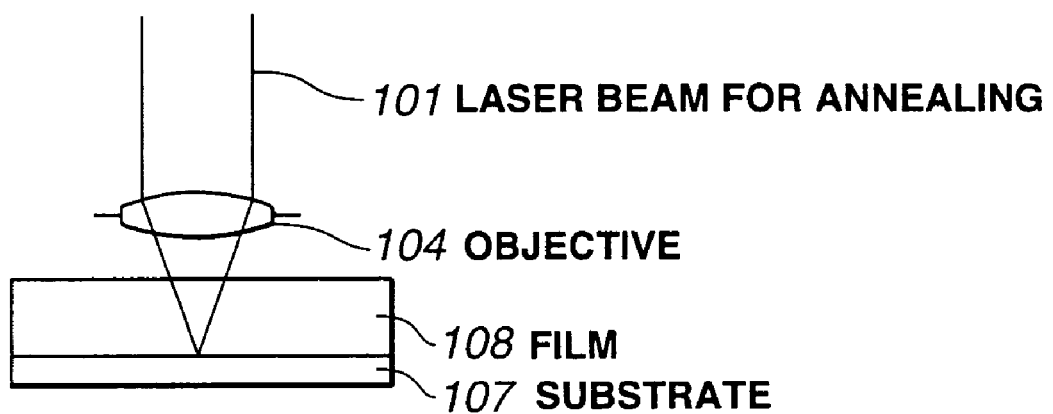
FIG. 19 is a diagram illustrating an optical system of an annealing apparatus used in Experimental Example 10 of the present invention.

In a magnetooptical recording medium of Experimental Example 10, a polycarbonate substrate having a track pitch of 0.55 μm, a groove width of 0.4 μm, and a groove depth of 40 nm was used as the substrate, and only groove portions were used as recording tracks. Since this track pitch is smaller than the diffraction limit of the optical system, a known sample servo method was adopted as a tracking servo method. The film structure was the same as that of the magnetooptical recording medium of Experimental Example 7. In order to disconnect exchange coupling between recording tracks, each land portion between adjacent grooves, each serving as a recording track, was annealed by a laser beam. Annealing was performed using an optical system shown in FIG. 19 by condensing a laser onto a land portion of the magnetooptical recording medium, after film forming to form film 108 on substrate 107, from the film 108 side under the conditions of a wavelength λ of 408 nm of a laser beam 101 for annealing, a numerical aperture NA of 0.85 of an objective 104, a linear velocity during annealing of 4.5 m/s, and laser power of 7.2 mW.

In the magnetooptical recording medium of Experimental Example 10, in order to study influence by the stray magnetic field from two adjacent tracks in a tone pattern signal having a shortest mark length of 0.107 μm with 0.08 μm/bit (1–7) RLL modulation, DC magnetization was performed for two adjacent tracks of a recording track, and a change in the width of reproduced pulses due to different polarities was studied.

The results indicate that, even when influence by the stray magnetic field was greatly changed by changing the polarity by reversing the direction of magnetization as positive/negative (upward/downward) in two adjacent tracks of a recording track, the amount of change of the width of reproduced pulses in the recording track was only 0.21 ns. That is a very small value of about 0.9% with respect to the window width of 22.22 ns. The jitter value at a rise of the waveform of a reproduced signal, i.e., a jitter value at POS polarity, at that time was 3.20 ns.

As for the recording-magnetic-field sensitivity with 0.08 μm/bit (1–7) modulation, recording characteristics saturated at an external magnetic field of 200 Oe, and the BER had excellent values equal to or less than 3.0 E–5 in all cases irrespective of the direction of magnetization in two adjacent tracks of a recording track.

As described above, in the magnetooptical recording medium of Experimental Example 10, it was clear that influence by the floating magnetic field from two adjacent tracks during a reproducing operation is very small, and an excellent reproducing operation can be performed with a low error rate with which an error in a reproducing operation is hardly produced.

COMPARATIVE EXAMPLE 4

In a magnetooptical recording medium of Comparative Example 4, films having the configuration of Comparative Example 3 were formed on a substrate having the same shape as in Experimental Example 10. The evaluation of recording/reproducing signals as in Experimental Example 9 was performed. The results of the evaluation indicate that, when influence by the stray magnetic field was greatly changed by changing the polarity by reversing the direction of magnetization as positive/negative (upward/downward) in two adjacent tracks of a recording track, the amount of change of the width of reproduced pulses in the recording track was 2.44 ns. That is a very large value of about 11.1% with respect to the window width of 22.22 ns. The jitter value at a rise of the waveform of a reproduced signal, i.e., a jitter value at POS polarity, at that time was 3.24 ns.

As for the recording-magnetic-field sensitivity with 0.08 μm/bit (1–7) modulation, recording characteristics saturated at an external magnetic field of 200 Oe, and the BER had very poor values of about 5.0 E–4 in any cases irrespective of the direction of magnetization in two adjacent tracks of a recording track.

As described above, in the magnetooptical recording medium of Comparative Example 4, it was clear that, since variations in the width of reproduced pulses due to influence by the stray magnetic field from two adjacent tracks during a reproducing operation were produced, the measured BER values degraded, and a stable reproducing operation could not be performed because an error tends to be produced in a reproducing operation.

As described above, according to the present invention, by providing a magnetization compensation layer for reducing the total magnetization of at least a displacement layer at the room temperature, it is possible to reduce the floating magnetic field applied to a reproducing/recording portion from a low temperature region. As a result, it is possible to mitigate bad influence, for example, by the stray magnetic field during recording/reproducing processing, and to obtain excellent and stable reproducing/recording characteristics. Accordingly, it is possible to provide a recording medium having a high recording-magnetic-field sensitivity even when a track pitch is small and marks are very small, and to provide excellent reproducing characteristics, in which a surface recording density is more improved than in conventional cases.

The individual components shown in the drawings are all well known in the domain-wall-displacement-type magnetooptical recording medium arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A domain-wall-displacement magnetooptical recording medium, comprising:
    a displacement layer in which domain walls are displaced and rare-earth-element sub-lattice magnetization is dominant at room temperature;
    a memory layer for holding recorded magnetic domains;
    a switching layer provided between said displacement layer and said memory layer that has a Curie temperature lower than Curie temperatures of said displacement layer and said memory layer; and
    a magnetization compensation layer having a composition such that iron-family-element sub-lattice magnetization is dominant at room temperature, whereby information is reproduced by magnifying the recorded magnetic domains transferred from said memory layer to said displacement layer, by displacing walls of the recorded magnetic domains.

2. A recording medium according to claim 1, wherein said magnetization compensation layer is a sub-layer of said displacement layer.

3. A recording medium according to claim 1, wherein said magnetization compensation layer is provided at a side of said memory layer opposite to a side where said switching layer is provided, and is not direct exchange coupled to said memory layer.

4. A recording medium according to claim 3, wherein a Curie temperature of said magnetization compensation layer is within a range of ±20° C. with respect to a temperature at which total magnetization of all magnetic layers other than said magnetization compensation layer is substantially zero.

5. A recording medium according to claim 3, wherein a thickness of said magnetization compensation layer is within a range of 15–20% with respect to a total thickness of all magnetic layers other than said magnetization compensation layer.

6. A recording medium according to claim 1, wherein said recording medium has a plurality of recording tracks, and wherein coupling by exchange interaction in a direction of a surface of at least said displacement layer is disconnected or mitigated at both said portions of each of said plurality of recording tracks.

* * * * *

UNITED STATES PATENT AND TRADEMARK OFFICE
CERTIFICATE OF CORRECTION

PATENT NO. : 7,173,885 B2
APPLICATION NO. : 10/718600
DATED : February 6, 2007
INVENTOR(S) : Miyakoshi et al.

It is certified that error appears in the above-identified patent and that said Letters Patent is hereby corrected as shown below:

On The Title Page, Item (56) REFERENCES CITED

Other Publications, "Shiratori et al., "high-Density Magneto-optical . . . Detection", J. Magn. Soc. Jpn., vol. 22, Suppl. 52 (1998), pp. 47-50" should be deleted (duplicate).

COLUMN 20

Line 25, "said" should read --side--.

Signed and Sealed this

Eleventh Day of December, 2007

JON W. DUDAS
*Director of the United States Patent and Trademark Office*